United States Patent
Shah et al.

(10) Patent No.: US 10,997,062 B1
(45) Date of Patent: May 4, 2021

(54) SYSTEM AND METHOD FOR IMPLEMENTING AN AUTOMATED REGRESSION TESTING MODULE

(71) Applicant: JPMorgan Chase Bank, N.A., New York, NY (US)

(72) Inventors: Shyamal J. Shah, Wesley Chapel, FL (US); Angel Leon, Tampa, FL (US); Katelyn V. Rumenik, Tampa, FL (US); Riddhi B. Bhatt, Tampa, FL (US); Dennis Macke, St. Petersburg, FL (US); Alejandro Dominguez Valdes, Tampa, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/653,533

(22) Filed: Oct. 15, 2019

(51) Int. Cl.
*G06F 11/36* (2006.01)

(52) U.S. Cl.
CPC ...... *G06F 11/3688* (2013.01); *G06F 11/3664* (2013.01); *G06F 11/3684* (2013.01)

(58) Field of Classification Search
CPC ............. G06F 11/3688; G06F 11/3684; G06F 11/3664
See application file for complete search history.

(56) References Cited

U.S. PATENT DOCUMENTS

| | | | | |
|---|---|---|---|---|
| 8,276,123 B1* | 9/2012 | Deng | .................... | G06F 11/368 717/125 |
| 10,157,122 B1* | 12/2018 | Gohil | .................. | G06F 11/3696 |
| 2006/0150026 A1* | 7/2006 | Kolawa | .................... | H04L 67/36 714/38.14 |
| 2008/0010535 A1* | 1/2008 | Dasgupta | ............ | G06F 11/3688 714/38.1 |
| 2016/0034382 A1* | 2/2016 | Kumar | ................ | G06F 11/3676 717/124 |
| 2017/0270036 A1* | 9/2017 | Alex | .................... | G06F 11/3684 |
| 2018/0308132 A1* | 10/2018 | Sharma | .................. | G06Q 30/0269 |
| 2019/0018761 A1* | 1/2019 | Ramraz | ............... | G06F 11/3688 |
| 2019/0196948 A1* | 6/2019 | Raman | ................ | G06F 16/9024 |
| 2019/0377668 A1* | 12/2019 | Angermayer | ....... | G06F 16/2358 |

* cited by examiner

*Primary Examiner* — Daxin Wu
(74) *Attorney, Agent, or Firm* — Greenblum & Bernstein, P.L.C.

(57) ABSTRACT

Various methods, apparatuses/systems, and media for implementing an automated testing module are disclosed. A processor creates a draft test suite that incorporates a plurality of features, each feature including a test scenario that comprises steps that describe the test scenario in a human readable form. The processor also compiles the steps of the test scenario into a single step in a reusable format; receives a request to perform a testing for an application; de-compiles the single step, in response to received request, to create a complete list of steps used in the scenario; generates a final test suite based on the de-complied single step in response to the received request; and automatically executes the final test suite to test the application without rewriting code.

20 Claims, 5 Drawing Sheets

SYSTEM AND METHOD FOR IMPLEMENTING AN AUTOMATED REGRESSION TESTING MODULE

TECHNICAL FIELD

This disclosure generally relates to automated testing of software application, and, more particularly, to methods and apparatuses for implementing an automated regression testing module for automating regression testing of software application using reusable test suites.

BACKGROUND

As software application becomes increasingly more complex, testing such software application may also become more complex as a large number of unique combinations of paths and modules may be tested for each program. Conventional tools may exist for automating software application testing. However, many of these conventional tools may require writing code that may require specific skill set and expertise to develop in order to test the software application. Software development in the Internet-era has grown increasingly complex. Software applications must not only handle and process complex calculations and tasks, but must be able to accurately and efficiently process a large variety of data types and data content.

Moreover, such conventional tools may have shortcomings that may make them highly unorganized. These conventional tools may operate with application features being the highest level of data organization. That is, entire applications may not have their individual features organized under a testing suite. In addition, the tests generated by conventional tools may also tend to be rigid and non-reusable in nature due to the peculiarities of an application business logic. Depending on the complexity of this logic, test steps may generally become highly specialized, hence not reusable. In addition, data used on these tests may be defined within the tests themselves. That is, changes to this data may require direct code and test changes, thereby necessitating re-packaging and re-distributing of the test application.

SUMMARY

The present disclosure, through one or more of its various aspects, embodiments, and/or specific features or sub-components, provides, among other features, various systems, servers, devices, methods, media, programs, and platforms for implementing an automated regression testing module for executing automated regression testing of software application in a much faster, easier and more efficient manner compared to conventional testing by using a graphical user interface that may allow organizing individual features of entire applications under a testing suite and making the test suite reusable without requiring to recode or requiring any high level code developing skills, but the disclosure is not limited thereto.

According to an aspect of the present disclosure, a method for implementing an automated regression testing module that provides a framework for automatic regression testing by utilizing one or more processors and one or more memories is disclosed. The method may include: creating, by utilizing a graphical user interface (GUI), a draft test suite, the draft test suite incorporating a plurality of features, each feature including a test scenario that comprises steps that describe the test scenario in a human readable form; compiling the steps of the test scenario into a single step in a reusable format configured to be utilized in executing all previously defined steps associated with the plurality of features and corresponding test scenarios within the draft test suite; receiving a request to perform a regression testing for an application; de-compiling the single step, in response to the received request, to create a complete list of steps used in the scenario; generating a final test suite based on the de-complied single step in response to the received request; and automatically executing the final test suite to test the application.

According to another aspect of the present disclosure, the method may further include: receiving a request to perform additional regression testing for the application; incorporating the reusable format including the single step into another test suite for subsequent regression testing of the application without rewriting code to generate the final test suite; and automatically executing the final test suite to perform additional regression testing for the application.

According to yet another aspect of the present disclosure, wherein generating a final test suite may further include: compiling the steps corresponding to the test scenario into importables to support re-usability of the steps in executing all previously defined steps associated with the plurality of features and corresponding test scenarios within the draft test suite; storing the importables onto a local database; de-compiling the importables, in response to the receive request, by performing lookups within the local database based on a content-value of a step with a keyword "import"; replacing the step with the keyword "import" with step-collection of a found importable based on a result of the lookups to create a complete list of steps used in the scenario; and generating the final test suite based on the complete list of steps used in the scenario without rewriting code.

According to a further aspect of the present disclosure, wherein generating a final test suite may further include: performing lookups within a local database to determine whether a dynamic keyword is used; replacing the keyword, including its delimiters, by a value of a found keyword based on a result of the lookups to create a complete list of steps used in the scenario; and generating the final test suite based on the complete list of steps used in the scenario without rewriting code.

According to yet another aspect of the present disclosure, wherein generating a final test suite may further include: accessing a local database to fetch a data file utilized in the scenario to obtain the complete list of steps used in the scenario and distribution of example headers and data; and formatting the data in the fetched data file into Gherkin language; and inserting the formatted data into the scenario.

According to an additional aspect of the present disclosure, wherein the final test suite may be represented as the highest hierarchy object in the GUI.

According to a further aspect of the present disclosure, the method may further include: exporting the final test suite to a file format having any one of the following file extensions: .xls, .xlsx, .xlsm, .xlt, .xlts, and .xml; and wherein the exported file format is fully executable in an automated mode that automatically executes the regression testing of the application without rewriting code.

According to yet another aspect of the present disclosure, the method may further include: generating, by utilizing the GUI, a report comprising one or more graphs, one or more charts, or one or more encountered errors, based on the execution of the final test suite.

According to a further aspect of the present disclosure, the method may further include: packaging the report in both JavaScript Object Notation (JSON) and Hypertext Markup Language (HTML) formats; and transmitting the packaged report to emails associated with the test suite.

According to another aspect of the present disclosure, a system for implementing an automated regression testing module that provides a framework for automatic regression testing is disclosed. The system may include a receiver configured to receive a request for testing an application; and a processor operatively connected to the receiver via a communication network and configured to: create, by utilizing a graphical user interface (GUI), a draft test suite, the draft test suite incorporating a plurality of features, each feature including a test scenario that comprises steps that describe the test scenario in a human readable form; compile the steps of the test scenario into a single step in a reusable format configured to be utilized in executing all previously defined steps associated with the plurality of features and corresponding test scenarios within the draft test suite; de-compile the single step, in response to the received request, to create a complete list of steps used in the scenario; generate a final test suite based on the de-complied single step in response to the received request; and automatically execute the final test suite to test the application.

According to yet another aspect of the present disclosure, the receiver may be configured to receive a request to perform additional regression testing for the application, and the processor may be further configured to: incorporate the reusable format including the single step into another test suite for subsequent regression testing of the application without rewriting code to generate the final test suite; and automatically execute the final test suite to perform additional regression testing for the application.

According to a further aspect of the present disclosure, wherein, in generating a final test suite, the processor may be further configured to: compile the steps corresponding to the test scenario into importables to support re-usability of the steps in executing all previously defined steps associated with the plurality of features and corresponding test scenarios within the draft test suite; store the importables onto a local database; de-compile the importables, in response to the receive request, by performing lookups within the local database based on a content-value of a step with a keyword "import"; replace the step with the keyword "import" with step-collection of a found importable based on a result of the lookups to create a complete list of steps used in the scenario; and generate the final test suite based on the complete list of steps used in the scenario without rewriting code.

According to another aspect of the present disclosure, wherein, in generating a final test suite, the processor may be further configured to: perform lookups within a local database to determine whether a dynamic keyword is used; replace the keyword, including its delimiters, by a value of a found keyword based on a result of the lookups to create a complete list of steps used in the scenario; and generate the final test suite based on the complete list of steps used in the scenario without rewriting code.

According to a further aspect of the present disclosure, wherein, in generating a final test suite, the processor may be further configured to: access a local database to fetch a data file utilized in the scenario to obtain the complete list of steps used in the scenario and distribution of example headers and data; and format the data in the fetched data file into Gherkin language; and insert the formatted data into the scenario.

According to another aspect of the present disclosure, a non-transitory computer readable medium configured to store instructions for implementing an automated regression testing module that provides a framework for automatic regression testing is disclosed. The instructions, when executed, may cause a processor to perform the following: creating, by utilizing a graphical user interface (GUI), a draft test suite, the draft test suite incorporating a plurality of features, each feature including a test scenario that comprises steps that describe the test scenario in a human readable form; compiling the steps of the test scenario into a single step in a reusable format configured to be utilized in executing all previously defined steps associated with the plurality of features and corresponding test scenarios within the draft test suite; receiving a request to perform a regression testing for an application; de-compiling the single step, in response to the received request, to create a complete list of steps used in the scenario; generating a final test suite based on the de-complied single step in response to the received request; and automatically executing the final test suite to test the application.

According to a further aspect of the present disclosure, wherein the instructions, when executed, may cause the processor to further perform the following: receiving a request to perform additional regression testing for the application; incorporating the reusable format including the single step into another test suite for subsequent regression testing of the application without rewriting code to generate the final test suite; and automatically executing the final test suite to perform additional regression testing for the application.

According to another aspect of the present disclosure, wherein in generating a final test suite, the instructions, when executed, may cause the processor to further perform the following: compiling the steps corresponding to the test scenario into importables to support re-usability of the steps in executing all previously defined steps associated with the plurality of features and corresponding test scenarios within the draft test suite; storing the importables onto a local database; de-compiling the importables, in response to the receive request, by performing lookups within the local database based on a content-value of a step with a keyword "import"; replacing the step with the keyword "import" with step-collection of a found importable based on a result of the lookups to create a complete list of steps used in the scenario; and generating the final test suite based on the complete list of steps used in the scenario without rewriting code.

According to a further aspect of the present disclosure, wherein in generating a final test suite, the instructions, when executed, may cause the processor to further perform the following: performing lookups within a local database to determine whether a dynamic keyword is used; replacing the keyword, including its delimiters, by a value of a found keyword based on a result of the lookups to create a complete list of steps used in the scenario; and generating the final test suite based on the complete list of steps used in the scenario without rewriting code.

According to yet another aspect of the present disclosure, wherein in generating a final test suite, the instructions, when executed, may cause the processor to further perform the following: accessing a local database to fetch a data file utilized in the scenario to obtain the complete list of steps used in the scenario and distribution of example headers and data; and formatting the data in the fetched data file into Gherkin language; and inserting the formatted data into the scenario.

According to a further aspect of the present disclosure, wherein the instructions, when executed, may cause the processor to further perform the following: representing the final test suite as the highest hierarchy object in the GUI; and exporting the final test suite to a file format having any one of the following file extensions: .xls, .xlsx, .xlsm, .xlts, and .xml, wherein the exported file format may be fully executable in an automated mode that automatically executes the regression testing of the application without rewriting code.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
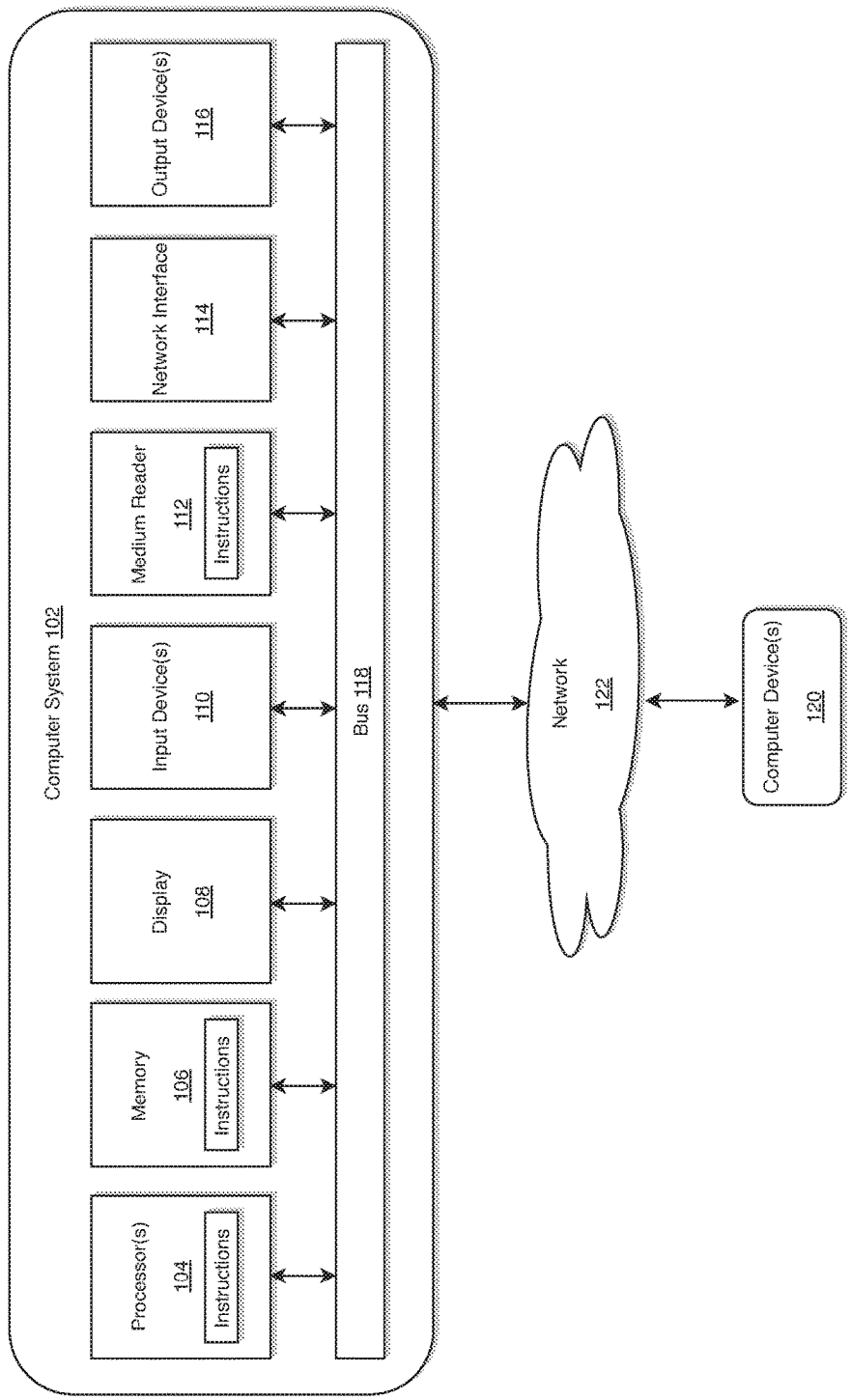
FIG. 1 illustrates a computer system for implementing an automated regression testing module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, ter multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last fora period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automated regression testing module for executing automated regression testing of software application in a much faster, easier and more efficient manner compared to conventional testing by using a graphical user interface that may allow organizing individual features of entire applications under a testing suite and making the test suite reusable without requiring to recode or requiring any high level code developing skills, but the disclosure is not limited thereto. For example, the various embodiments may also provide optimized processes of implementing an automated functional testing module for executing automated functional testing of software application in a much faster, easier and more efficient manner compared to conventional testing by using a graphical user interface that may allow organizing individual features of entire applications under a testing suite and making the test suite reusable without requiring to recode or requiring any high level code developing skills, but the disclosure is not limited thereto.

Figure 2:
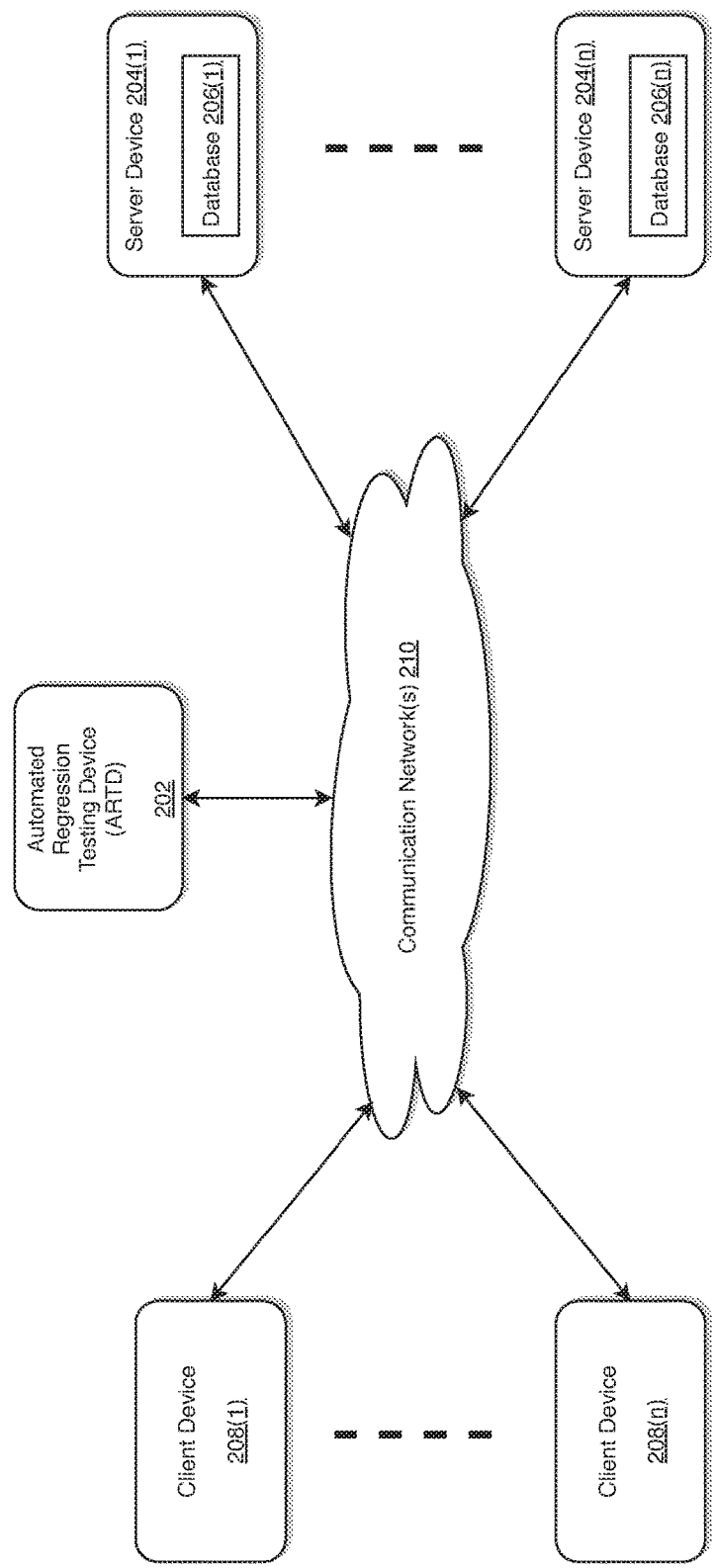
FIG. 2 illustrates an exemplary diagram of a network environment with an automated regression testing device in accordance with an exemplary embodiment.

Referring to FIG. 2, a schematic of an exemplary network environment 200 for implementing an automated regression testing device (ARTD) having the automated regression testing module (ARTM) of the instant disclosure is illustrated.

Conventional system, that does not implement an ARTM of the instant disclosure, may not be able to automate the regression testing of software application and may not provide a platform to allow organizing individual features of entire applications under a testing suite and making the test suite reusable without requiring to recode or requiring any high level code developing skills.

According to exemplary embodiments, the above-described problems associated with conventional approach of software application testing may be overcome by implementing an ARTD having the automated regression testing module as illustrated in FIG. 2. The ARTD 202 may be the same or similar to the computer system 102 as described with respect to FIG. 1. According to exemplary embodiments, the ARTD 202 may be considered to be a two-way interactive communication device such as a mobile computing device, cellular phone, landline phone or an Internet appliance controller.

The ARTD 202 may store one or more applications that can include executable instructions that, when executed by the ARTD 202, cause the ARTD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ARTD 202 itself, may be located in virtual server(s) running in a cloud-based computing environment rather than being tied to one or more specific physical network computing devices.

Also, the application(s) may be running in one or more virtual machines (VMs) executing on the ARTD 202. Additionally, in one or more embodiments of this technology, virtual machine(s) running on the ARTD 202 may be managed or supervised by a hypervisor.

In the network environment 200 of FIG. 2, the ARTD 202 is coupled to a plurality of server devices 204(1)-204(n) that hosts a plurality of databases 206(1)-206(n), and also to a plurality of client devices 208(1)-208(n) via communication network(s) 210. A communication interface of the ARTD 202, such as the network interface 114 of the computer system 102 of FIG. 1, operatively couples and communicates between the ARTD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ARTD 202, the server devices 204(1)-204(n), and/or the client devices 208(1)-208(n) may be coupled together via other topologies. Additionally, the network environment 200 may include other network devices such as one or more routers and/or switches, tier example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ARTD 202 may be a standalone device or integrated with one or more other devices or apparatuses, such as one or more of the server devices 204(1)-204(n), for example. In one particular example, the ARTD 202 may be hosted by one of the server devices 204(1)-204(n), and other arrangements are also possible. Moreover, one or more of the devices of the ARTD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ARTD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(*n*) that are configured to store metadata sets, data quality rules, and newly generated data.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204(1)-204(*n*) may contain a plurality of network computing devices that operate using a master/slave approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(*n*) or other client devices 208(1)-208(*n*).

According to exemplary embodiments, the client devices 208(1)-208(*n*) in this example may include any type of computing device that can facilitate the implementation of the ARTD 202 that may efficiently provide a platform for implementing an automated regression testing module for executing automated regression testing of software application in a much faster, easier and more efficient manner compared to conventional testing by using a graphical user interface that may allow organizing individual features of entire applications under a testing suite and making the test suite reusable without requiring to recode or requiring any high level code developing skills, but the disclosure is not limited thereto. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(*n*) may run interface applications, such as standard web browsers or standalone client applications, which may provide an interface to communicate with the ARTD 202 via the communication network(s) 210 in order to communicate user requests. The client devices 208(1)-208(*n*) may further include, among other features, a display device, such as a display screen or touchscreen, and/or an input device, such as a keyboard, for example.

Although the exemplary network environment 200 with the ARTD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ARTD 202, the server devices 204(1)-204(*n*), or the client devices 208(1)-208(*n*), for example, may be configured to operate as virtual instances on the same physical machine. For example, one or more of the ARTD 202, the server devices 204(1)-204(*n*), or the client devices 208(1)-208(*n*) may operate on the same physical device rather than as separate devices communicating through communication network(s) 210. Additionally, there may be more or fewer ARTDs 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
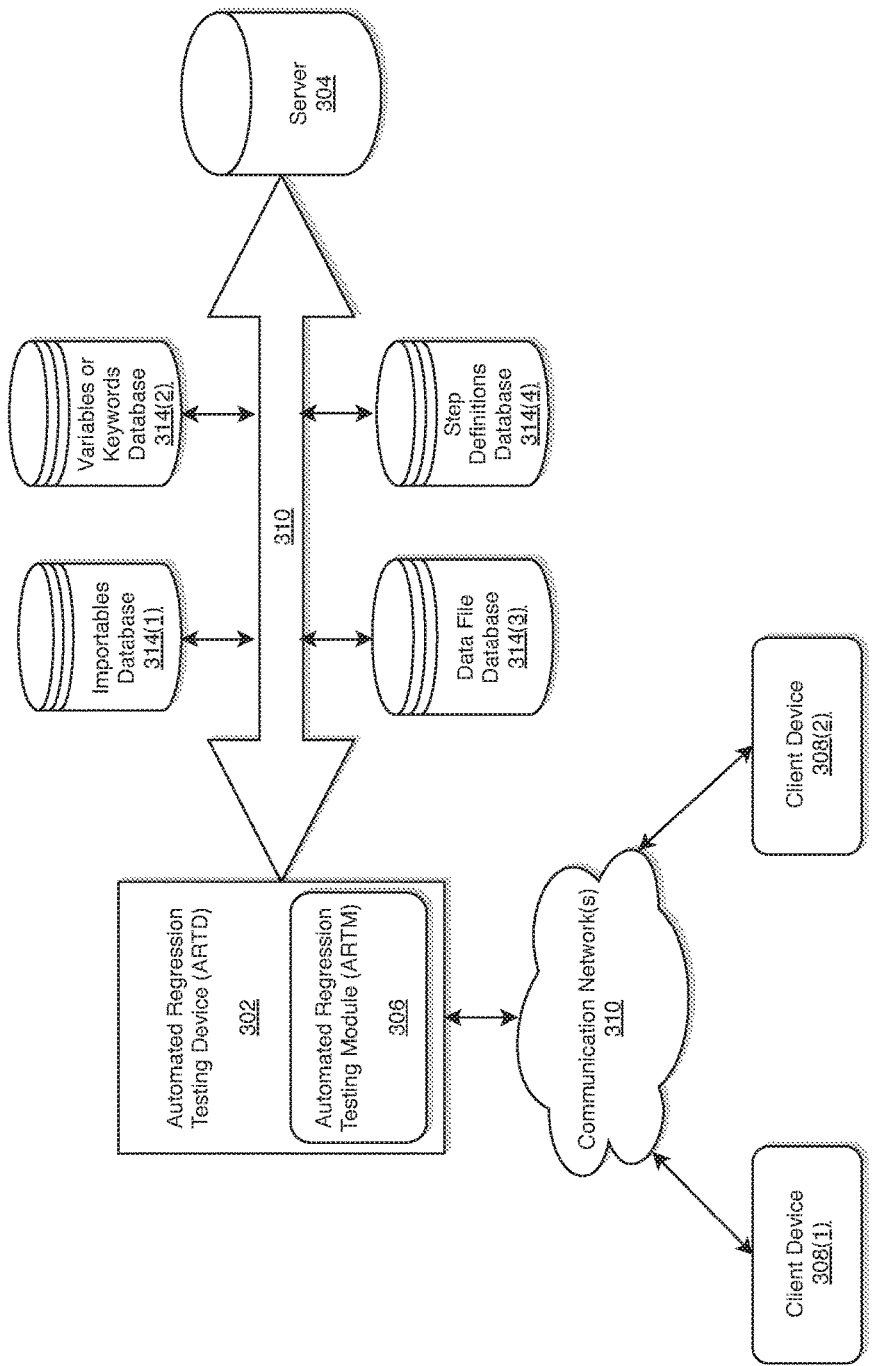
FIG. 3 illustrates a system diagram for implementing an automated regression testing device with an automated regression testing module in accordance with an exemplary embodiment.

FIG. 3 illustrates a system diagram for implementing an automated regression testing device (ARTD) with an automated regression resting module (ARTM) in accordance with an exemplary embodiment.

As illustrated in FIG. 3, the ARTD 302 including the ARTM 306 may be connected to a server 304, an importables database 314(1), a variables or keywords database 314(2), a data file database 314(3), and a step definitions database 314(4) via a communication network 310. Although the importables database 314(1), the variables or keywords database 314(2), the data file database 314(3), and the step definitions database 314(4) are illustrated as separate databases, the disclosure is not limited thereto. According to exemplary embodiments, these four databases may constitute a single database. The ARTD 302 may also be connected to a first client device 308(1) and a second client device 308(2) via the communication network 310, but the disclosure is not limited thereto.

According to exemplary embodiment, the ARTD 302 is described and shown in FIG. 3 as including the ARTM 306, although it may include other rules, policies, modules, databases, or applications, for example. According to exemplary embodiments, the importables database 314(1), the variables or keywords database 314(2), the data file database 314(3), and the step definitions database 314(4) may constitute a local database and such local database may be embedded within the ARTD 302.

According to exemplary embodiments, the importables may create certain behaviors or interactions that can be injected into multiple test cases without having to rewrite the test code or redefine the test interactions.

As will be described below, the ARTM 306 may be configured to execute automated regression testing of software application much faster, easier and more efficient compared to conventional testing by using a graphical user interface that may allow organizing individual features of entire applications under a testing suite (e.g., a single testing suite or one testing suite) and make the test suite reusable without requiring to recode or requiring any high level code developing skills, but the disclosure is not limited thereto. According to exemplary embodiments, as will be described below, in order to execute automated regression testing of software application in a much faster, easier and more efficient manner, the ARTM 306 may be configured to create, by utilizing a graphical user interface (GUI), a draft test suite, the draft test suite incorporating a plurality of features, each feature including a test scenario that comprises steps that describe the test scenario in a human readable form; compile the steps of the test scenario into a single step in a reusable format configured to be utilized in executing all previously defined steps associated with the plurality of features and corresponding test scenarios within the draft test suite; receive a request to perform a regression testing for an application; de-compile the single step, in response to the received request, to create a complete list of steps used in the scenario; generate a final test suite based on the de-complied single step in response to the received request; and automatically execute the final test suite to test the application. The results of execution may be stored onto a local database or the server 304 for later access.

The first client device 308(1) and the second client device 308(2) are illustrated as being in communication with the ARTD 302. In this regard, the first client device 308(1) and the second client device 308(2) may be "clients" of the ARTD 302 and are described herein as such. Nevertheless, it is to be known and understood that the first client device 308(1) and/or the second client device 308(2) need not necessarily be "clients" of the ARTD 302, or any entity described in association therewith herein. Any additional or alternative relationship may exist between either or both of the first client device 308(1) and the second client device 308(2) and the ARTD 302, or no relationship may exist.

The first client device 308(1) may be, for example, a smart phone. Of course, the first client device 308(1) may be any additional device described herein. The second client device 308(2) may be, for example, a personal computer (PC). Of course, the second client device 308(2) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the first client device 308(1) and the second client device 308(2) may communicate with the ARTD 302 via broadband or cellular communication. Of course, these embodiments are merely exemplary and are not limiting or exhaustive.

As will be described below, the ARTD 302 is configured for executing automating regression or functional testing of software application in a much faster, easier and more efficient manner compared to conventional testing by using modifiable graphical user interfaces that may provide error tracking, reporting, a dashboard for choosing tests, and a platform for continuous integration capabilities without requiring any high level code developing skills. As will be further described below, the ARTD 302 is configured for improving processing speed of conventional regression or functional testing of software application by using modifiable graphical user interfaces of the instant disclosure. In addition, according to exemplary embodiments, by executing reusable test suites generated by the ARTD 302 reduces memory spaces for running a test for software application, thereby improving conventional processes of software application testing.

Figure 4:
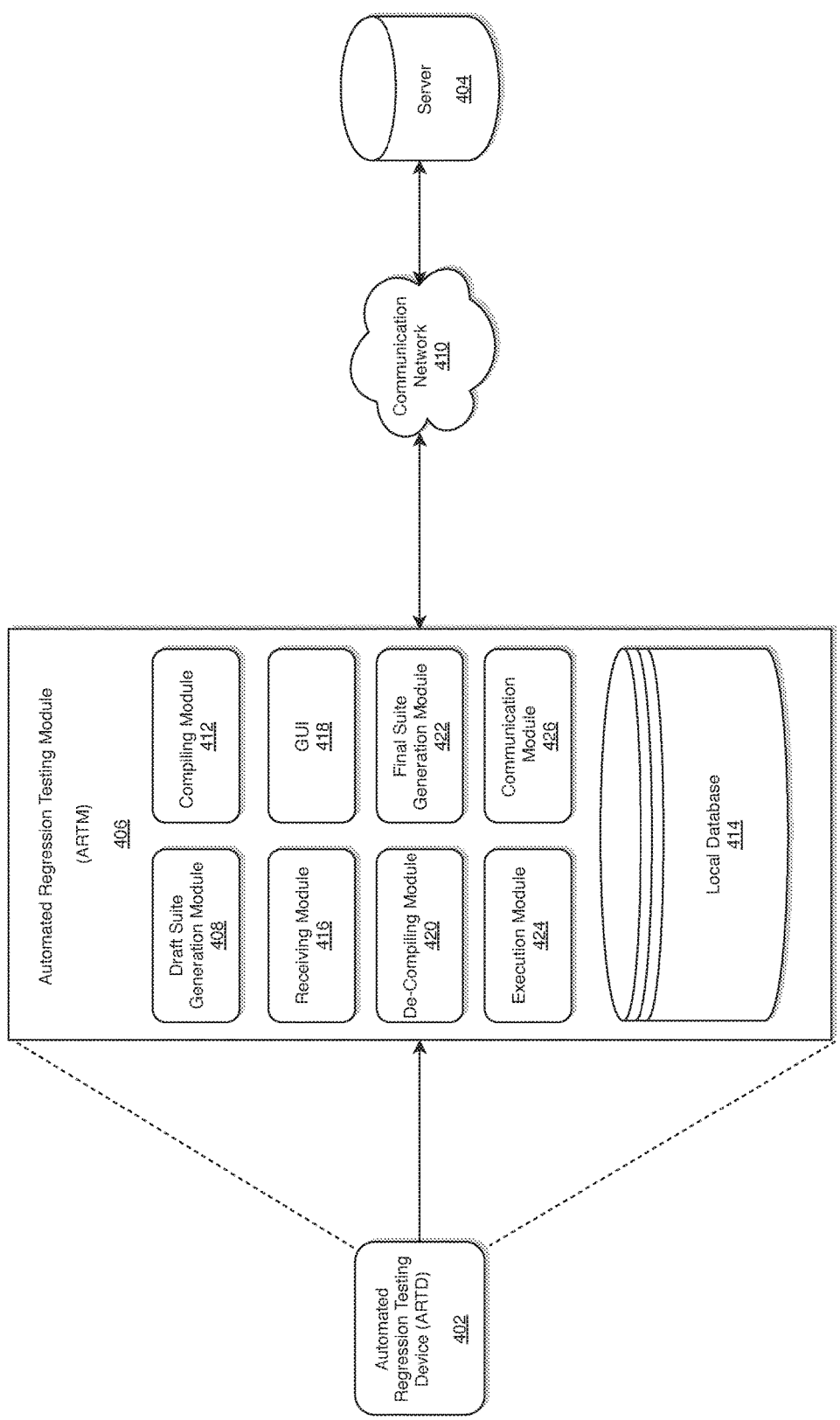
FIG. 4 illustrates a system diagram for implementing an automated regression testing module of FIG. 3 in accordance with an exemplary embodiment.

FIG. 4 illustrates a system diagram for implementing an automated regression testing module of FIG. 3 in accordance with an exemplary embodiment. As shown in FIG. 4, the ARTM 406 may be in communication with the server 404 via a communication network 410. According to exemplary embodiments, the server 404 may be the same or equivalent to the server 304 as illustrated in FIG. 3 or to the server device 204 as illustrated in FIG. 2.

As shown in FIG. 4, according to exemplary embodiments, the ARTM 406 may include a draft suite generation module 408, a compiling module 412, a receiving module 416, a graphical user interface (GUI) 418, a de-compiling module 420, a final suite generation module 422, an execution module 424, a communication module 426, and a local database 414.

The process may be executed via the communication network(s) 410, which may comprise plural networks as described above. For example, in an exemplary embodiment, the various components of the ARTM 406 may communicate with the test server 404 and the local database 414 that includes step definitions, importables, variables or keywords, and data file, etc. via the communication network(s) 410 and the communication module 426. Of course, these embodiments are merely exemplary and are not limiting or exhaustive.

According to exemplary embodiments, each of the draft suite generation module 408, the compiling module 412, the receiving module 416, the de-compiling module 420, the final suite generation module 422, the execution module 424, and the communication module 426 may be physically implemented by electronic optical) circuits such as logic circuits, discrete components, microprocessors, hard-wired circuits, memory elements, wiring connections, and the like, which may be formed using semiconductor-based fabrication techniques or other manufacturing technologies. Alternatively, each of the draft suite generation module 408, the compiling module 412, the receiving module 416, the de-compiling module 420, the final suite generation module 422, the execution module 424, and the communication module 426 may be implemented by dedicated hardware, or as a combination of dedicated hardware to perform some functions and a processor (e.g., one or more programmed microprocessors and associated circuitry) to perform other functions.

According to exemplary embodiments, the draft suite generation module 408 may be configured to create, by utilizing the GUI 418, a draft test suite. The draft test suite may incorporate a plurality of features, each feature may include a test scenario that may comprise steps that describe the test scenario in a human readable form.

According to exemplary embodiments, a plurality of scenarios may be generated based on information stored on the local database 414. Referring to FIGS. 3, and 4, the local database 414 may be constituted by the importables database 314(1), variables or keywords database 314(2), data file database 314(3) and step definitions database 314(4). For example, the local database 414 may store Cucumber step definitions, but the disclosure is not limited thereto. According to exemplary embodiments, other step definitions created by other languages may also be stored on the local database 414 and may be accessed via the receiving module 416 and the GUI 418 to create the scenarios. Similarly, the scenarios may also be created by accessing the importables, variables or keywords and/or data file from the local database 414 by utilizing the receiving module 416 and the GUI 418. The plurality of features may be generated from the plurality of scenarios and the draft suite may be generated by the draft suite generation module 408 from the plurality features. That is, the creation of testing suites may incorporate a collection of features, and in turn, the features may comprise a collection of scenarios that may contain steps from a step definition library stored in the step definitions database 314(4), importables stored in the importables database 314(1), variables and keywords stored in the variables and keywords database 314(2), and may utilize a data file stored on the data file database 314(3).

According to exemplary embodiments, the compiling module 412 may be configured to compile the steps of the test scenario into a single step in a reusable format configured to be utilized in executing all previously defined steps associated with the plurality of features and corresponding test scenarios within the draft test suite generated by the draft suite generation module 408.

According to exemplary embodiments, the receiving module 416 may be configured to receive a request to perform a regression testing for an application. According to exemplary embodiments, the receiving module 416 may also be configured to receive a request to perform a functional testing for an application.

According to exemplary embodiments, the de-compiling module 420 may be configured to de-compile the single step, in response to the received request received by the receiving module 416, to create a complete list of steps used in the scenario.

According to exemplary embodiments, the final suite generation module 422 may be configured to generate a final test suite based on the de-complied single step generated by the de-compiling module 420 in response to the received request received by the receiving module 416. The execution module 424 may be configured to automatically execute the final test suite to test the application without requiring rewriting of code.

According to exemplary embodiments, the receiving module 412 may be further configured to receive a request to perform additional regression testing for the application. The ARTM 406 may be configured to incorporate the reusable format including the single step into another test suite for subsequent regression testing of the application without rewriting code to generate the final test suite by the final test suite generation module 422. According to exemplary embodiments, the execution module 424 may be further configured to automatically execute the final test suite to perform additional regression testing for the application.

According to exemplary embodiments, in generating a final test suite by the final suite generation module 422, the compiling module 412 may be further configured to compile the steps corresponding to the test scenario into importables to support re-usability of the steps in executing all previously defined steps associated with the plurality of features and corresponding test scenarios within the draft test suite generated by the draft test suite generation module 408. The local database 414 may be configured to store the importables. The de-compiling module 420 may be further configured to de-compile the importables, in response to the receive request received by the receiving module, by performing lookups within the local database 414 based on a content-value of a step with a keyword "import"; replace the step with the keyword "import" with step-collection of a found importable based on a result of the lookups to create a complete list of steps used in the scenario. The final suite generation module 422 may be further configured to generate the final test suite based on the complete list of steps used in the scenario without rewriting code.

According to exemplary embodiments, in generating a final test suite by the final suite generation module 422, the compiling module 412 may be further configured to perform lookups within the local database 414 to determine whether a dynamic keyword is used; and replace the keyword, including its delimiters, by a value of a found keyword based on a result of the lookups to create a complete list of steps used in the scenario. The final suite generation module 422 may be configured to generate the final test suite based on the complete list of steps used in the scenario without rewriting code.

According to exemplary embodiments, in generating a final test suite by the final suite generation module 422, the compiling module 412 may be further configured to access the local database 414 to fetch a data file utilized in the scenario to obtain the complete list of steps used in the scenario and distribution of example headers and data, format the data in the fetched data file into Gherkin language, and insert the formatted data into the scenario.

According to exemplary embodiments, the final test suite may be represented as the highest hierarchy object in the GUI 418.

According to exemplary embodiments, the ARTM 406 may be configured to export the final test suite to a file format having any one of the following file extensions: .xls, .xlsx, .xlsm, .xlt, .xlts, and .xml, but the disclosure is not limited thereto. And the exported file format may be fully executable in an automated mode that automatically executes the regression testing of the application by the execution module 424 without rewriting code.

According to exemplary embodiments, the ARTM 406 may be configured to generate, by utilizing the GUI 418, a report comprising one or more graphs, one or more charts, or one or more encountered errors, based on the execution of the final test suite by the execution module 424. Exemplary results are illustrated in the attached Appendix A.

According to exemplary embodiments, the ARTM 406 may be configured to package the report in both JavaScript Object Notation (JSON) and Hypertext Markup Language (HTML) formats, but the disclosure is not limited thereto. The ARTM 406 may be configured to transmit the packaged report to emails associated with the test suite by utilizing the communication module 426.

According to exemplary embodiments, the GUI 418 utilized for creation of the test suites and reporting of the test results. Such GUI 418 may be configured to expose the functionality of the presently described ARTM 406 with referring to FIGS. 3 and 4 with a variety of input fields and selectable options. The GUI 418 may specifically provide menus or other selectable interfaces such as a menu enabling selection and manipulation of reusable test suites generated by the final suite generation module 422. An exemplary GUI is illustrated in the attached Appendix A.

According to exemplary embodiments, each feature may comprise a scenario that includes steps accessed from a step definition library, importables, variables and keywords that are utilized for automatic execution of the regression testing of the application, and wherein the scenario may utilize a data file accessed from an in-memory database running in a personal mode or from a file system running in an automated mode. According to exemplary embodiments, attached Appendix A illustrates a tutorial as to how to construct a scenario that includes importables, data files, and keywords, but the disclosure is not limited thereto.

According to exemplary embodiments, the ARTM 406 may be configured to generate declarative test write up using in the off-line mode or using a spreadsheet. According to this exemplary embodiment, the ARTM 406 may be configured to allow a user to define test suites into an excel file into different tabs following a very simple constructs that illustrate a relationship between a condition and an expected result based on the condition, and inject those test suites into a framework generated by the ARTM 406 that will execute the test based on a simple writeup in a human readable way, but the disclosure is not limited thereto.

According to exemplary embodiments, the ARTM 406 may also be configured to operate by utilizing a GUI element picker. In this exemplary embodiment, a framework generated by the ARTM 406 may be configured to support the GUI for creating a test suite. The ARTM 406 may be configured to allow a user to bring the test suite up by the GUI and go to a desired web address and pick a desired element from there and may instruct, by utilizing the GUI, the framework to perform a further test execution and analyze the test result. While the user is picking a desired element from the web address by utilizing the GUI, in the background (without user's interactions) the framework generated by the ARTM 406 may be configured to automatically generate the actual test suite that needs the code that needs to be generated for the test and execute it. Once this is done, the generated test suite may be stored in a local database for subsequent executions of the test suite over and over again based on receiving subsequent requests for testing without requiring rewriting of code. An exemplary GUI is illustrated in the attached Appendix A.

According to exemplary embodiments, a non-transitory computer readable medium may be configured to store instructions for implementing an automated regression testing module that provides a framework for automatic regression testing. According to exemplary embodiments, a non-transitory computer readable medium may be further configured to store instructions for implementing an automated functional testing module that provides a framework for automatic functional testing.

According to exemplary embodiments, the instructions, when executed, may cause a processor embedded within the ARTD 302 to perform the following: creating, by utilizing a graphical user interface (GUI), a draft test suite, the draft test suite incorporating a plurality of features, each feature including a test scenario that comprises steps that describe the test scenario in a human readable form; compiling the steps of the test scenario into a single step in a reusable format configured to be utilized in executing all previously defined steps associated with the plurality of features and corresponding test scenarios within the draft test suite; receiving a request to perform a regression testing for an application; de-compiling the single step, in response to the received request, to create a complete list of steps used in the scenario; generating a final test suite based on the de-complied single step in response to the received request; and automatically executing the final test suite to test the application. The processor may be the same or similar to the processor 104 as illustrated in FIG. 1.

According to exemplary embodiments, the instructions, when executed, may further cause the processor embedded within the ARTD 302 to perform the following: receiving a request to perform additional regression testing for the application; incorporating the reusable format including the single step into another test suite for subsequent regression testing of the application without rewriting code to generate the final test suite; and automatically executing the final test suite to perform additional regression testing for the application.

According to exemplary embodiments, in generating a final test suite, the instructions, when executed, may further cause the processor embedded within the ARTD 302 to perform the following: compiling the steps corresponding to the test scenario into importables to support re-usability of the steps in executing all previously defined steps associated with the plurality of features and corresponding test scenarios within the draft test suite; storing the importables onto a local database; de-compiling the importables, in response to the receive request, by performing lookups within the local database based on a content-value of a step with a keyword "import"; replacing the step with the keyword "import" with step-collection of a found importable based on a result of the lookups to create a complete list of steps used in the scenario; and generating the final test suite based on the complete list of steps used in the scenario without rewriting code.

According to exemplary embodiments, in generating a final test suite, the instructions, when executed, may further cause the processor embedded within the ARTD 302 to perform the following: performing lookups within a local database to determine whether a dynamic keyword is used; replacing the keyword, including its delimiters, by a value of a found keyword based on a result of the lookups to create a complete list of steps used in the scenario; and generating the final test suite based on the complete list of steps used in the scenario without rewriting code.

According to exemplary embodiments, in generating a final test suite, the instructions, when executed, may further cause the processor embedded within the ARTD 302 to perform the following: accessing a local database to fetch a data file utilized in the scenario to obtain the complete list of steps used in the scenario and distribution of example headers and data; and formatting the data in the fetched data file into Gherkin language; and inserting the formatted data into the scenario.

According to exemplary embodiments, in generating a final test suite, the instructions, when executed, may further cause the processor embedded within the ARTD 302 to perform the following: representing the final test suite as the highest hierarchy object in the GUI; and exporting the final test suite to a file format having any one of the following file extensions: .xls, .xlsx, .xlsm, .xlt, .xlts, and .xml, wherein the exported file format may be fully executable in an automated mode that automatically executes the regression testing of the application without rewriting code.

Figure 5:
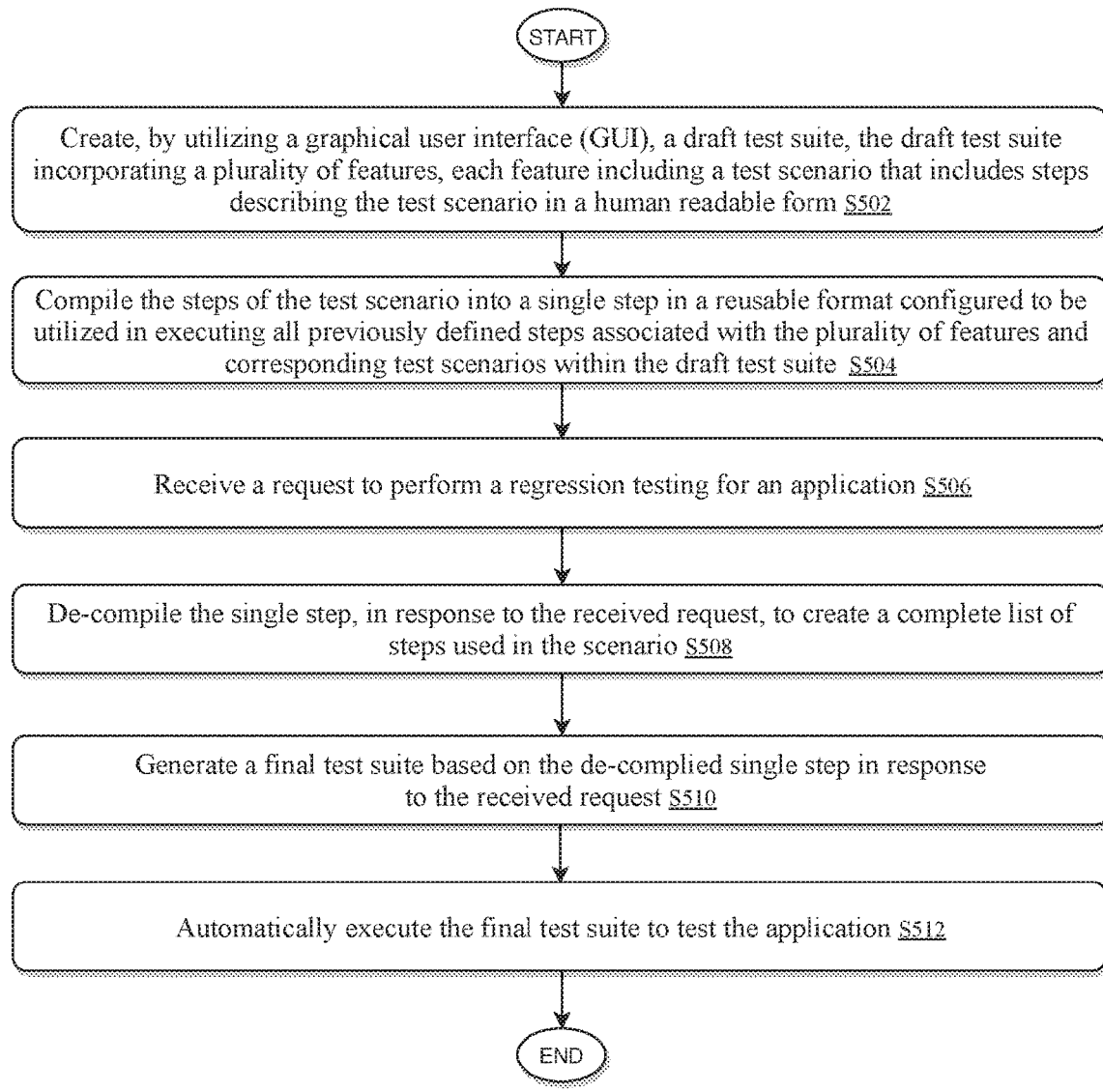
FIG. 5 illustrates a flow chart for implementing an automated regression testing module in accordance with an exemplary embodiment.

FIG. 5 illustrates a flow chart for implementing an automated regression testing module in accordance with an exemplary embodiment. The automation suite module may be the same or similar to the ARTMs illustrated herein with reference to FIGS. 2-4, but the disclosure is not limited thereto.

In the process 500 of FIG. 5, at step S502, a draft test suite may be created by a draft suite generation module by utilizing a graphical user interface (GUI). The draft test suite may incorporate a plurality of features, each feature may include a test scenario that comprises steps that describe the test scenario in a human readable form.

At step S504, the steps of the test scenario may be compiled by a compiling module into a single step in a reusable format configured to be utilized in executing all previously defined steps associated with the plurality of features and corresponding test scenarios within the draft test suite.

At step S506; a request to perform a regression testing for an application may be received by a receiving module. According to exemplary embodiments, at step S506, a request to perform a functional testing for an application may also be received.

At step S508; the single step may be decompiled by a de-compiling module, in response to the received request, to create a complete list of steps used in the scenario.

At step S510, a final test suite may be generated based on the de-compiled single step in response to the received request.

At step S512, the final test suite may be automatically executed to test the application.

According to exemplary embodiments, the process 500 may further include: receiving a request to perform additional regression testing for the application; incorporating the reusable format including the single step into another test suite for subsequent regression testing of the application without rewriting code to generate the final test suite; and automatically executing the final test suite to perform additional regression testing for the application.

According to exemplary embodiments, in generating a final test suite, the process 500 may further include: compiling the steps corresponding to the test scenario into importables to support re-usability of the steps in executing all previously defined steps associated with the plurality of features and corresponding test scenarios within the draft test suite; storing the importables onto a local database; de-compiling the importables, in response to the receive request, by performing lookups within the local database based on a content-value of a step with a keyword "import"; replacing the step with the keyword "import" with step-collection of a found importable based on a result of the lookups to create a complete list of steps used in the scenario; and generating the final test suite based on the complete list of steps used in the scenario without rewriting code.

According to exemplary embodiments, in generating a final test suite, the process 500 may further include: performing lookups within a local database to determine whether a dynamic keyword is used; replacing the keyword, including its delimiters, by a value of a found keyword based on a result of the lookups to create a complete list of steps used in the scenario; and generating the final test suite based on the complete list of steps used in the scenario without rewriting code.

According to exemplary embodiments, in generating a final test suite, the process 500 may further include: accessing a local database to fetch a data file utilized in the scenario to obtain the complete list of steps used in the scenario and distribution of example headers and data; and formatting the data in the fetched data file into Gherkin language; and inserting the formatted data into the scenario.

According to exemplary embodiments, the process 500 may further include: exporting the final test suite to a file format having any one of the following file extensions: .xls, .xlsx, .xlsm, .xlt, .xlts, and .xml; and wherein the exported file format may be fully executable in an automated mode that automatically executes the regression testing of the application without rewriting code.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim, Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automated regression testing module that provides a framework for automatic regression testing by utilizing one or more processors and one or more memories, the method comprising:
   creating, by utilizing a graphical user interface (GUI), a draft test suite, the draft test suite incorporating a plurality of features, each feature including a test scenario that comprises steps that describe the test scenario in a human readable form;
   compiling the steps of the test scenario into a single step in a reusable format configured to be utilized in executing all previously defined steps associated with the plurality of features and corresponding test scenarios within the draft test suite;
   receiving a request to perform a regression testing for an application;
   de-compiling the single step, in response to the received request, to create a complete list of steps used in the scenario;
   generating a final test suite based on the de-complied single step in response to the received request, wherein generating the final test suite includes:
      accessing a local database to fetch a data file utilized in the scenario to obtain the complete list of steps used in the scenario and distribution of example headers and data; and
      formatting the data in the fetched data file; and
      inserting the formatted data into the scenario; and
   automatically executing the final test suite to test the application.

2. The method according to claim 1, further comprising:
   receiving a request to perform additional regression testing for the application;
   incorporating the reusable format including the single step into another test suite for subsequent regression testing of the application without rewriting code to generate the final test suite; and
   automatically executing the final test suite to perform additional regression testing for the application.

3. The method according to claim 1, wherein generating a final test suite further comprising:
   compiling the steps corresponding to the test scenario into importables to support re-usability of the steps in executing all previously defined steps associated with the plurality of features and corresponding test scenarios within the draft test suite;
   storing the importables onto a local database;
   de-compiling the importables, in response to the receive request, by performing lookups within the local database based on a content-value of a step with a keyword "import";
   replacing the step with the keyword "import" with step-collection of a found importable based on a result of the lookups to create a complete list of steps used in the scenario; and
   generating the final test suite based on the complete list of steps used in the scenario without rewriting code.

4. The method according to claim 1, wherein generating a final test suite further comprising:
   performing lookups within a local database to determine whether a dynamic keyword is used;
   replacing the keyword, including its delimiters, by a value of a found keyword based on a result of the lookups to create a complete list of steps used in the scenario; and
   generating the final test suite based on the complete list of steps used in the scenario without rewriting code.

5. The method according to claim 1, further comprising:
   formatting the data in the fetched data file into Gherkin language.

6. The method according to claim 1, wherein the final test suite is represented as the highest hierarchy object in the GUI.

7. The method according to claim 1, further comprising:
   exporting the final test suite to a file format having any one of the following file extensions: .xls, .xlsx, .xlsm, .xlt, .xlts, and .xml; and
   wherein the exported file format is fully executable in an automated mode that automatically executes the regression testing of the application without rewriting code.

8. The method according to claim 1, further comprising: generating, by utilizing the GUI, a report comprising one or more graphs, one or more charts, or one or more encountered errors, based on the execution of the final test suite.

9. The method according to claim 8, further comprising:
   packaging the report in both JavaScript Object Notation (JSON) and Hypertext Markup Language (HTML) formats; and
   transmitting the packaged report to emails associated with the test suite.

10. A system for implementing an automated regression testing module that provides a framework for automatic regression testing, comprising:
   a receiver configured to receive a request for testing an application; and
   a processor operatively connected to the receiver via a communication network and configured to:
      create, by utilizing a graphical user interface (GUI), a draft test suite, the draft test suite incorporating a plurality of features, each feature including a test scenario that comprises steps that describe the test scenario in a human readable form;

compile the steps of the test scenario into a single step in a reusable format configured to be utilized in executing all previously defined steps associated with the plurality of features and corresponding test scenarios within the draft test suite;

de-compile the single step, in response to the received request, to create a complete list of steps used in the scenario;

generate a final test suite based on the de-complied single step in response to the received request, wherein, in generating the final test suite, the processor is further configured to:

access a local database to fetch a data file utilized in the scenario to obtain the complete list of steps used in the scenario and distribution of example headers and data; and format the data in the fetched data file; and insert the formatted data into the scenario; and automatically execute the final test suite to test the application.

11. The system according to claim 10, wherein the receiver is configured to receive a request to perform additional regression testing for the application, and wherein the processor is further configured to:

incorporate the reusable format including the single step into another test suite for subsequent regression testing of the application without rewriting code to generate the final test suite; and automatically execute the final test suite to perform additional regression testing for the application.

12. The system according to claim 10, wherein, in generating a final test suite, the processor is further configured to:

compile the steps corresponding to the test scenario into importables to support re-usability of the steps in executing all previously defined steps associated with the plurality of features and corresponding test scenarios within the draft test suite;

store the importables onto a local database;

de-compile the importables, in response to the receive request, by performing lookups within the local database based on a content-value of a step with a keyword "import";

replace the step with the keyword "import" with step-collection of a found importable based on a result of the lookups to create a complete list of steps used in the scenario; and generate the final test suite based on the complete list of steps used in the scenario without rewriting code.

13. The system according to claim 10, wherein, in generating a final test suite, the processor is further configured to:

perform lookups within a local database to determine whether a dynamic keyword is used;

replace the keyword, including its delimiters, by a value of a found keyword based on a result of the lookups to create a complete list of steps used in the scenario; and generate the final test suite based on the complete list of steps used in the scenario without rewriting code.

14. The system according to claim 10, wherein the processor is further configured to:

format the data in the fetched data file into Gherkin language.

15. A non-transitory computer readable medium configured to store instructions for implementing an automated regression testing module that provides a framework for automatic regression testing, wherein, when executed, the instructions cause a processor to perform the following:

creating, by utilizing a graphical user interface (GUI), a draft test suite, the draft test suite incorporating a plurality of features, each feature including a test scenario that comprises steps that describe the test scenario in a human readable form;

compiling the steps of the test scenario into a single step in a reusable format configured to be utilized in executing all previously defined steps associated with the plurality of features and corresponding test scenarios within the draft test suite;

receiving a request to perform a regression testing for an application;

de-compiling the single step, in response to the received request, to create a complete list of steps used in the scenario;

generating a final test suite based on the de-complied single step in response to the received request, wherein in generating the final test suite, the instructions, when executed, cause the processor to further perform the following:

accessing a local database to fetch a data file utilized in the scenario to obtain the complete list of steps used in the scenario and distribution of example headers and data; and formatting the data in the fetched data file; and inserting the formatted data into the scenario; and automatically executing the final test suite to test the application.

16. The non-transitory computer readable medium according to claim 15, wherein the instructions, when executed, cause the processor to further perform the following:

receiving a request to perform additional regression testing for the application;

incorporating the reusable format including the single step into another test suite for subsequent regression testing of the application without rewriting code to generate the final test suite; and automatically executing the final test suite to perform additional regression testing for the application.

17. The non-transitory computer readable medium according to claim 15, wherein in generating a final test suite, the instructions, when executed, cause the processor to further perform the following:

compiling the steps corresponding to the test scenario into importables to support re-usability of the steps in executing all previously defined steps associated with the plurality of features and corresponding test scenarios within the draft test suite;

storing the importables onto a local database;

de-compiling the importables, in response to the receive request, by performing lookups within the local database based on a content-value of a step with a keyword "import";

replacing the step with the keyword "import" with step-collection of a found importable based on a result of the lookups to create a complete list of steps used in the scenario; and generating the final test suite based on the complete list of steps used in the scenario without rewriting code.

18. The non-transitory computer readable medium according to claim 15, wherein in generating a final test suite, the instructions, when executed, cause the processor to further perform the following:

performing lookups within a local database to determine whether a dynamic keyword is used;

replacing the keyword, including its delimiters, by a value of a found keyword based on a result of the lookups to create a complete list of steps used in the scenario; and generating the final test suite based on the complete list of steps used in the scenario without rewriting code.

19. The non-transitory computer readable medium according to claim 15, wherein the instructions, when executed, cause the processor to further perform the following:

formatting the data in the fetched data file into Gherkin language.

20. The non-transitory computer readable medium according to claim 15, wherein the instructions, when executed, cause the processor to further perform the following:

representing the final test suite as the highest hierarchy object in the GUI; and exporting the final test suite to a file format having any one of the following file extensions: .xls, .xlsx, .xlsm, .xlt, .xlts, and .xml, wherein the exported file format is fully executable in an automated mode that automatically executes the regression testing of the application without rewriting code.

\* \* \* \* \*